(12) United States Patent
Nishina et al.

(10) Patent No.: US 6,271,886 B1
(45) Date of Patent: Aug. 7, 2001

(54) INFORMATION TRANSMITTING UNIT AND THE METHOD, INFORMATION RECEIVING UNIT AND THE METHOD, AND MEDIUM FOR THE SAME

(75) Inventors: Yasutomo Nishina, Chiba; Tomoyuki Hanai, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/334,535

(22) Filed: Jun. 16, 1999

(30) Foreign Application Priority Data

Jun. 18, 1998 (JP) .................................................. 10-171095

(51) Int. Cl.⁷ ............................... H04N 7/00; H04N 7/08
(52) U.S. Cl. ..................... 348/460; 348/461; 348/473; 348/906; 380/201; 725/114; 725/116
(58) Field of Search ............................ 348/10, 460, 461, 348/465, 473, 474, 906; 455/6.2, 6.3; 360/60; 386/1, 94; 380/201, 202, 231, 239; 725/114, 116, 135, 138, 144, 146

(56) References Cited

U.S. PATENT DOCUMENTS

| | | | |
|---|---|---|---|
| Re. 36,763 | * | 7/2000 | Kanota et al. ........................ 380/5 |
| 5,485,219 | * | 1/1996 | Woo .................................. 348/460 |
| 5,537,216 | * | 7/1996 | Yamashita et al. .................. 358/335 |
| 5,719,943 | * | 2/1998 | Amada et al. ......................... 380/49 |
| 5,825,968 | * | 10/1998 | Nishigaki et al. ..................... 386/94 |
| 5,856,852 | * | 1/1999 | Huh .................................... 348/460 |
| 5,991,500 | * | 11/1999 | Kanota et al. ......................... 386/94 |
| 6,047,103 | * | 4/2000 | Yamauchi et al. ..................... 386/94 |
| 6,052,145 | * | 4/2000 | Macrae et al. ........................ 348/10 |
| 6,073,122 | * | 6/2000 | Wool .................................. 380/201 |
| 6,091,882 | * | 7/2000 | Yuen et al. ........................... 386/83 |
| 6,100,916 | * | 8/2000 | August et al. ........................ 348/5.5 |
| 6,111,611 | * | 8/2000 | Ozkan et al. ......................... 348/465 |
| 6,115,533 | * | 9/2000 | Tahara et al. ......................... 386/94 |

* cited by examiner

Primary Examiner—Reinhard J. Eisenzopf
Assistant Examiner—Brian P. Yenke
(74) Attorney, Agent, or Firm—Frommer Lawrence & Haug, LLP.; William S. Frommer; Darren M. Simon

(57) ABSTRACT

The contents authoring unit classifies a program information into any one of the "information effective only in viewing", the information effective only in recording/reproducing, and the "information effective in viewing and recording/reproducing", and describes it on the basis of the classification. The contents controller of the receiving unit processes to classify the program information contained in the service information. The VCR control unit controls a VCR. Thereby, the invention utilizes the program information.

16 Claims, 10 Drawing Sheets

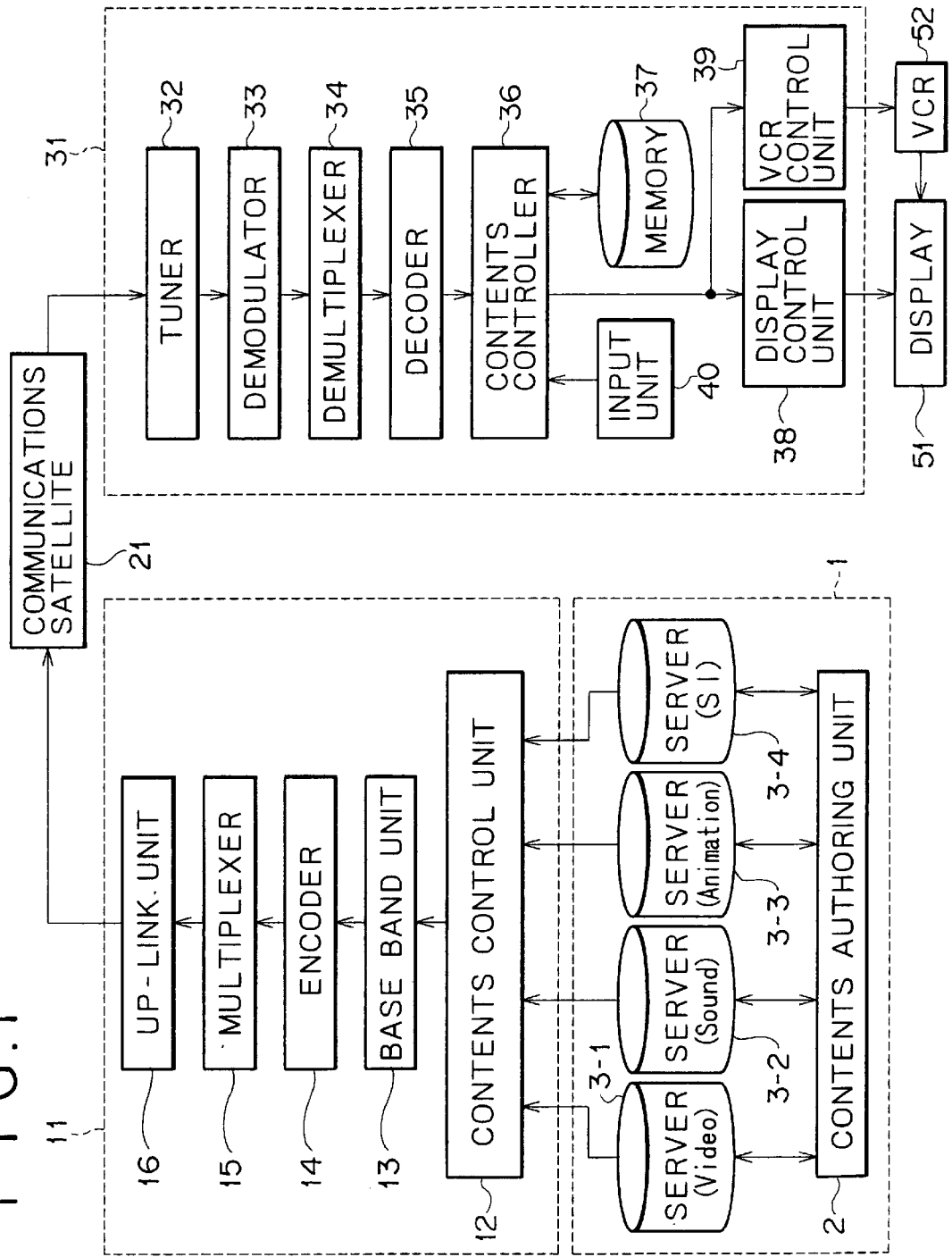

FIG. 2

| DATA STRUCTURE | NUMBER OF BITS | Identifier |
|---|---|---|
| event_information_section() { | | |
|     table_id | 8 | uimsbf |
|     section_syntax_indicator | 1 | bslbf |
|     reserved_feature_use | 1 | bslbf |
|     reserved | 2 | bslbf |
|     section_length | 12 | uimsbf |
|     service_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     transport_stream_id | 16 | uimsbf |
|     original_network_id | 16 | uimsbf |
|     segment_last_section_number | 8 | uimsbf |
|     last_table_id | 8 | uimsbf |
|     for(i=0;i<N;i++){ | | |
|         event_id | 16 | uimsbf |
|         start_time | 40 | bslbf |
|         duration | 24 | uimsbf |
|         running_status | 3 | uimsbf |
|         free_CA_mode | 1 | bslbf |
|         descriptors_loop_length | 12 | uimsbf |
|         for(j=0;j<M;j++){ | | |
|             descriptor() | | |
|         } | | |
|     } | | |
|     CRC_32 | 32 | rpchof |
| } | | |

EIT(Event Information table)

FIG. 3

| DATA STRUCTURE | NUMBER OF BITS | Identifier |
|---|---|---|
| content_descriptor() { | | |
|   descriptor_tag | 8 | uimsbf |
|   descriptor_length | 8 | uimsbf |
|   for (i=0;i<N;i++) { | | |
|     content_nibble_0 | 4 | uimsbf |
|     content_nibble_1 | 4 | uimsbf |
|     user_nibble_0 | 4 | uimsbf |
|     user_nibble_1 | 4 | uimsbf |
|   } | | |
| } | | |

FIG. 4

| content_nibble_0 | content_nibble_1 | user_nibble_0 | user_nibble_1 | |
|---|---|---|---|---|
| 0x0 | * | * | * | DESCRIBE PROGRAM INFORMATION EFFECTIVE IN VIEWING AND RECORDING/REPRODUCING |
| 0x1 | * | * | * | DESCRIBE PROGRAM INFORMATION EFFECTIVE ONLY IN VIEWING |
| 0x2 | * | * | * | DESCRIBE PROGRAM INFORMATION EFFECTIVE ONLY IN RECORDING/REPRODUCING |
| 0x3~0xF | * | * | * | reserved |

FIG. 5

| content_nibble_0 | content_nibble_1 | user_nibble_0 | user_nibble_1 | |
|---|---|---|---|---|
| 0x0 | 0x0 | 0x0 | 0x0 | MOVIE : GENERAL |
| | | | 0x1 | MOVIE : ACTION |
| | | | 0x2 | MOVIE : SCIENCE FICTION |
| | | | 0x3 | MOVIE : SUSPENSE (THRILLER) |
| | | | 0x4 | MOVIE : HORROR |
| | | | 0x5 | MOVIE : DETECTIVE (DETECTIVE, CRIMINAL STORY) |
| | | | 0x6 | MOVIE : SPY |
| | | | 0x7 | MOVIE : WAR |
| | | | 0x8 | MOVIE : DRAMA (HOME DRAMA) |
| | | | 0x9 | MOVIE : SOCIAL-MINDED DRAMA |
| | | | 0xA | MOVIE : MELODRAMA |
| | | | 0xB | MOVIE : FANTASY |
| | | | 0xC | MOVIE : LOVE (ROMANCE) |
| | | | 0xD | MOVIE : MYSTERY |
| | | | 0xE | MOVIE : COMEDY |
| | | | 0xF | MOVIE : OTHERS |

FIG. 6

| content_nibble_0 | content_nibble_1 | user_nibble_0 | user_nibble_1 | |
|---|---|---|---|---|
| 0x1 | 0x0 | 0x0 | 0x0 | SUGGESTION:GENERAL |
| | | | 0x1 | SUGGESTION:THIS EVENING |
| | | | 0x2 | SUGGESTION:TODAY |
| | | | 0x3 | SUGGESTION:THIS WEEK |
| | | | 0x4 | SUGGESTION:THIS MONTH |
| | | | 0x5 | SUGGESTION:FIRST APPEARANCE ON TV |
| | | | 0x6 | SUGGESTION:NOT-YET RELEASED IN THEATER |
| | | | 0x7 | SUGGESTION:NEW PROGRAM |
| | | | 0x8 | SUGGESTION:SPECIAL PROGRAM |
| | | | 0x9 | SUGGESTION:LIVE BROADCAST |
| | | | 0xA | SUGGESTION:RESERVED |
| | | | 0xB | SUGGESTION:RESERVED |
| | | | 0xC | SUGGESTION:RESERVED |
| | | | 0xD | SUGGESTION:RESERVED |
| | | | 0xE | SUGGESTION:RESERVED |
| | | | 0xF | SUGGESTION:OTHERS |

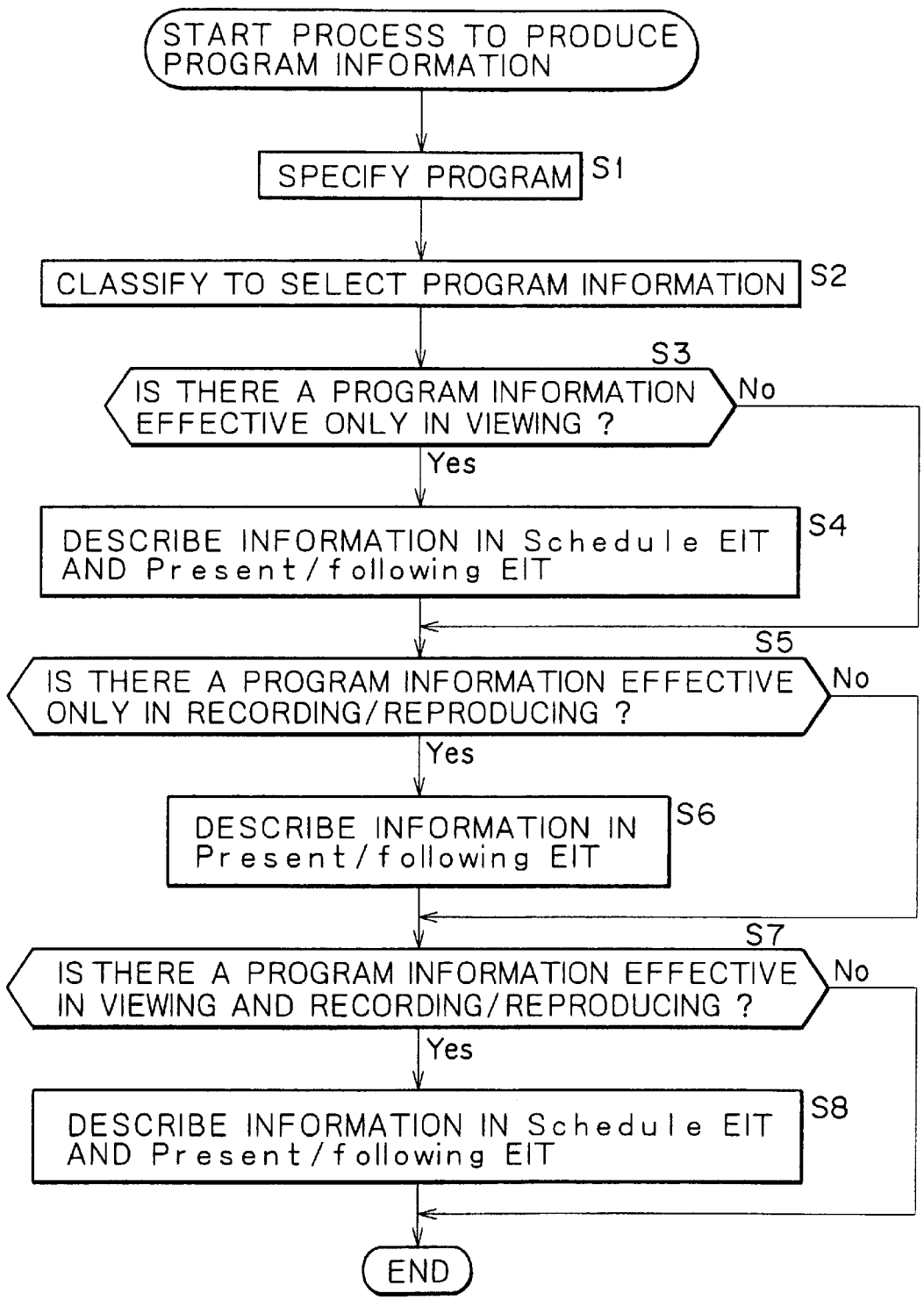

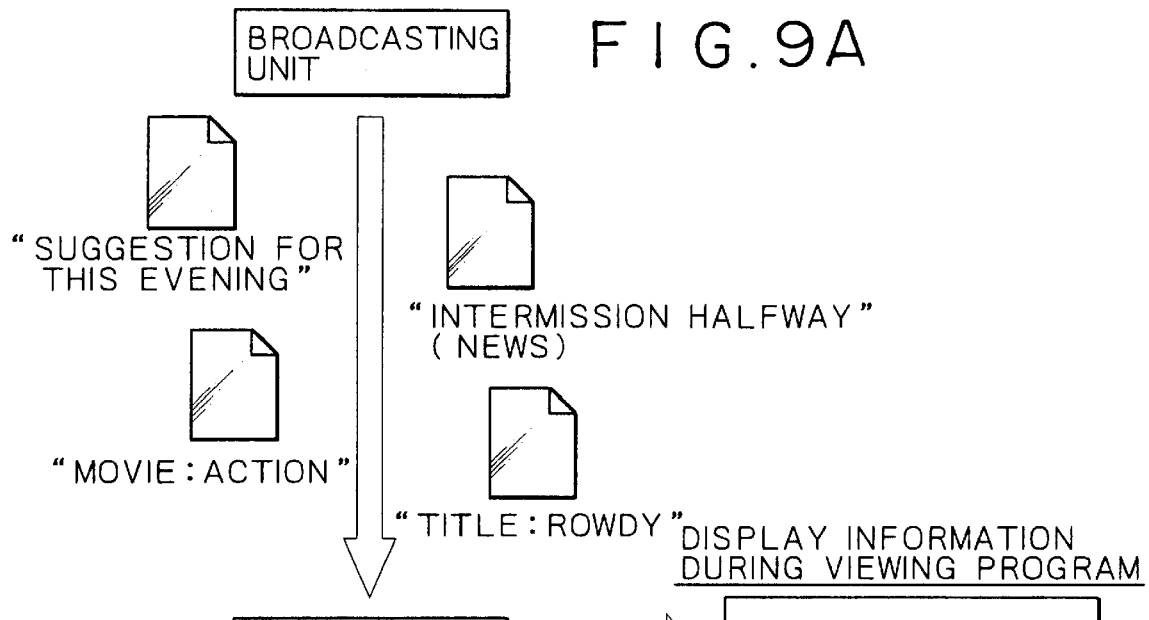
FIG. 9A
FIG. 9B
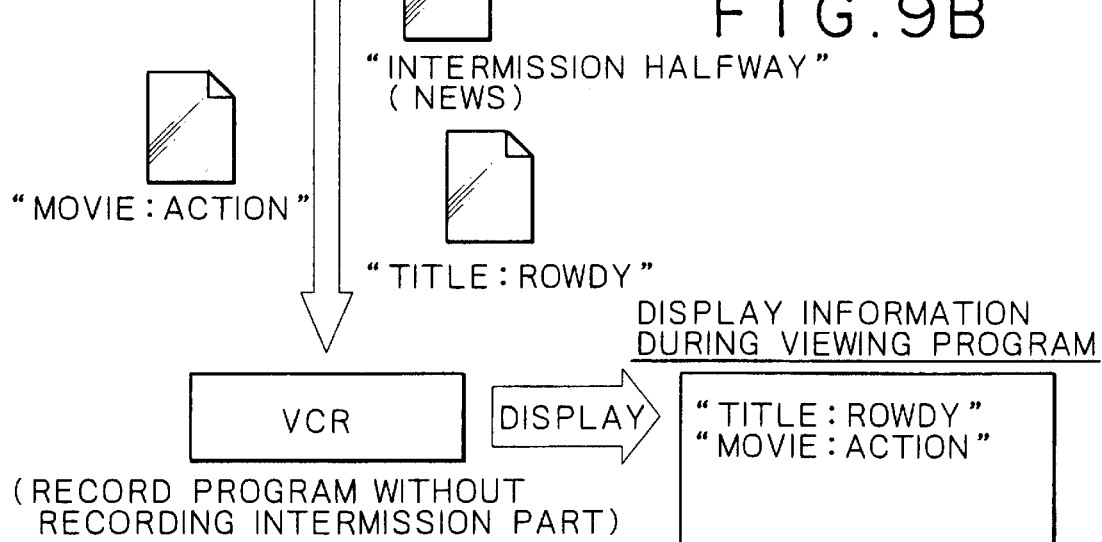
FIG. 9C
FIG. 9D

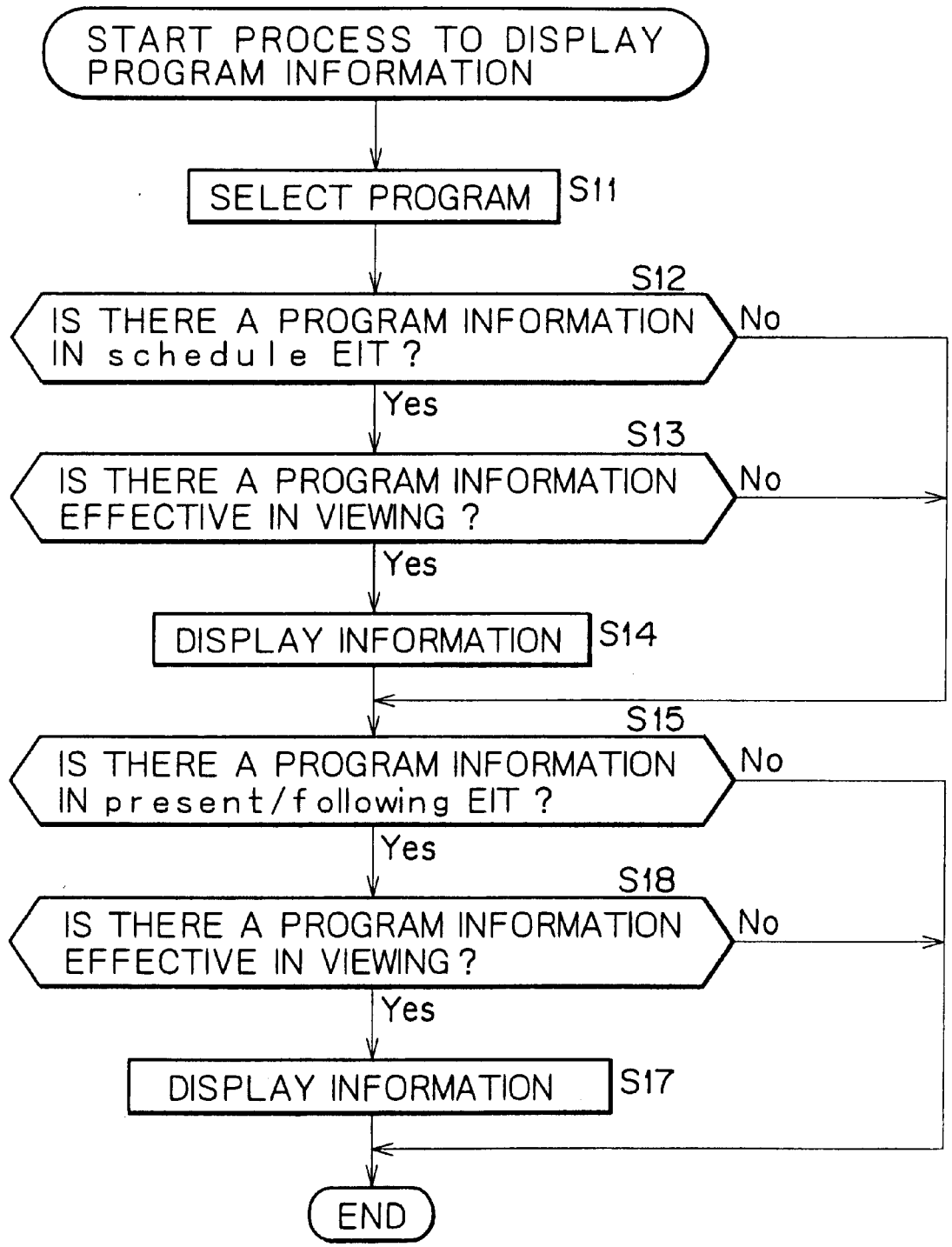

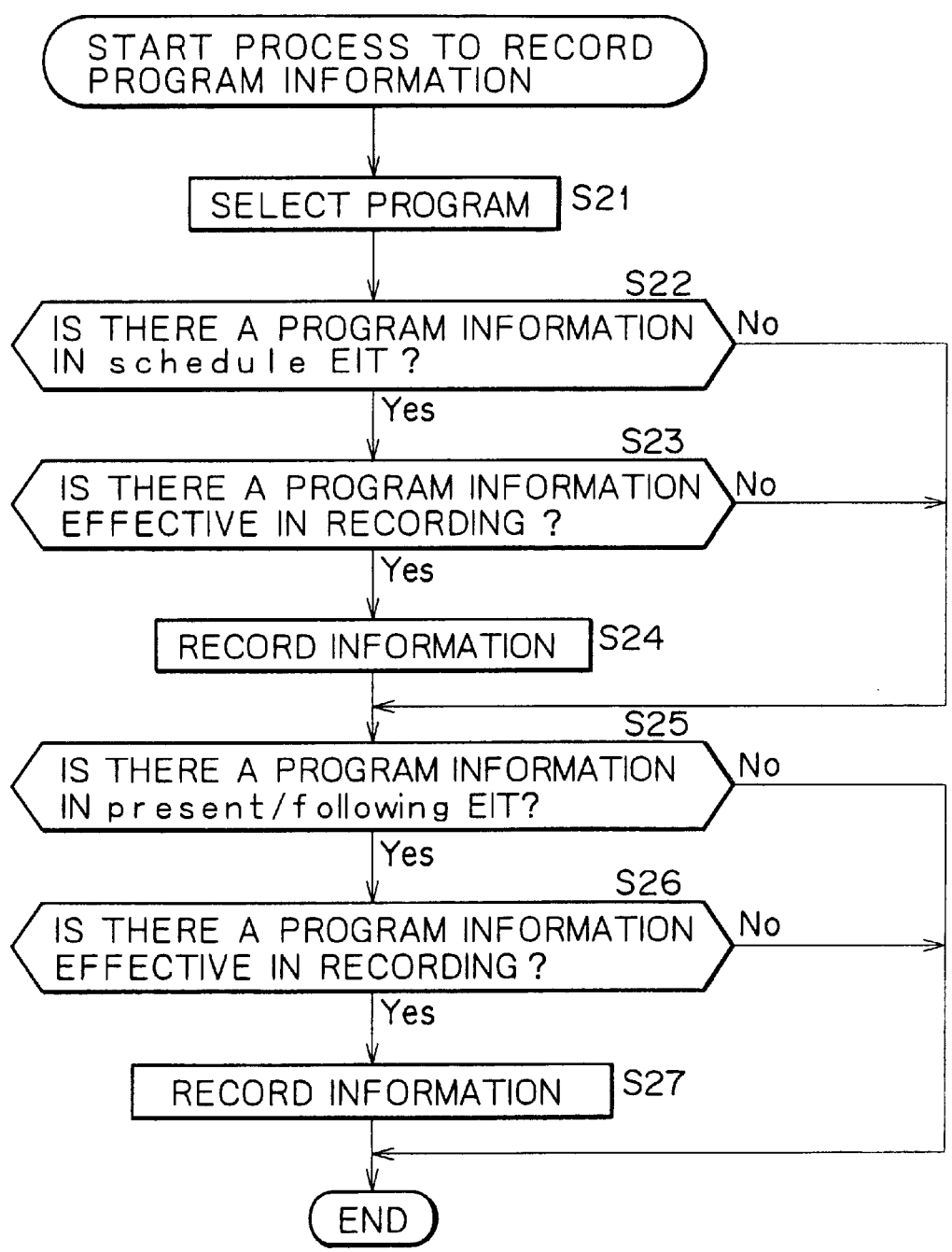

INFORMATION TRANSMITTING UNIT AND THE METHOD, INFORMATION RECEIVING UNIT AND THE METHOD, AND MEDIUM FOR THE SAME

BACKGROUND OF THE INVENTION

1. Field of the Invention

The present invention relates to an information transmitting unit and a method of the same, an information receiving unit and a method of the same, and a medium for effecting the same, which are used in transmitting and receiving a program information classified on the basis of the effectiveness in recording.

2. Background of the Invention

In the conventional digital multi-channel broadcasting system, the program information to give program names, broadcasting time, and genres, etc., are produced on the basis of the program service information specified in the MPEG2 (ITU-TH.222.0, ISO/IEC 13818-1), or the DVB (prETS300 468), which are broadcast. In this program service information, one genre is described with a two-byte parameter for one program. And, the information other than the genres of the program service information are described with text information.

Further, it is possible to describe in the program information various information other than the program names, broadcasting time, and genres, as mentioned above.

However, the whole information of various program information is not necessarily used as the effective information. Although information such as 'being a live program' and 'the first TV broadcasting' are effective in viewing the program (viewing during reception), they are not effective in recording and reproducing (recording the program received and reproducing it to view). Although a program of a news or a whether forecast, for example, is effective at the time when the program is broadcast, it is not effective in reproducing. Further, the information to indicate the channel and the information to display the CM sponsor, etc., are the same.

On the other hand, since the information to indicate the time (information quantity) required for broadcasting a program relates to the length of a magnetic tape that records the program, the information is necessary principally when recording the program.

However conventionally, since the program information is not classified on the basis of the necessity when recording the corresponding program, the program information is not effectively utilized, which is a problem.

SUMMARY OF THE INVENTION

The present invention has been made in view of the foregoing circumferences, and it intends to effectively utilize a program information by classifying the information on the basis of the necessity when recording the corresponding program information.

The information transmitting unit of claim 1 comprises: a generation means that generates a video information broadcast as a program, a determination means that determines a program information relating to the video information generated by the generation means, a classification means that classifies the program information determined by the determination means into a first program information effective in viewing the video information and a second program information ineffective in viewing the video information, a description means that describes the first program information in first and second service information description tables, and describes the second program information in the second service information description table, and a coding means that codes the video information generated by the generation means and the first and second service information description tables described by the description means.

The method of transmitting an information of claim 6 comprises: a generation step that generates a video information broadcast as a program, a determination step that determines a program information relating to the video information generated by the generation step, a classification step that classifies the program information determined by the determination step into a first program information effective in viewing the video information and a second program information ineffective in viewing the video information, a description step that describes the first program information in first and second service information description tables, and describes the second program information in the second service information description table, and a coding step that codes the video information generated by the generation step and the first and second service information description tables described by the description step.

The medium to provide a program of claim 10, which makes an information transmitting unit execute the processes including: a generation step that generates a video information broadcast as a program, a determination step that determines a program information relating to the video information generated by the generation step, a classification step that classifies the program information determined by the determination step into a first program information effective in viewing the video information and a second program information ineffective in viewing the video information, a description step that describes the first program information in first and second service information description tables, and describes the second program information in the second service information description table, and a coding step that codes the video information generated by the generation step and the first and second service information description tables described by the description step.

The information receiving unit of claim 11 comprises: a decoding means that decodes a coded video information, an extracting means that extracts the program information form the video information decoded by the decoding means, a receiving means that receives user's commands, and a processing means that processes to classify the program information extracted by the extracting means.

The method of receiving an information of claim 13 comprises: a decoding step that decodes the coded video information, an extracting step that extracts the program information from the video information decoded by the decoding step, a receiving step that receives user's commands, and a processing step that processes to classify the program information extracted by the extracting step.

The medium to provide a program of claim 14, which makes an information receiving unit execute the processes including: a decoding step that decodes a coded video information, an extracting step that extracts the program information from the video information decoded by the decoding step, a receiving step that receives user's commands, and a processing step that processes to classify the program information extracted by the extracting step.

BRIEF DESCRIPTION OF THE DRAWINGS

FIG. 1 is a block diagram to illustrate a construction of a digital multi-channel broadcasting system to which the invention is applied;

FIG. 2 is a chart to illustrate a data structure of the EIT;

FIG. 3 is a chart to illustrate a data structure of the content descriptor;

FIG. 4 is a chart to illustrate one example of parameters described in the content descriptor;

FIG. 5 is a chart to illustrate one example of parameters described in the content descriptor;

FIG. 6 is a chart to illustrate one example of parameters described in the content descriptor;

FIG. 8 is a flowchart that explains the process to produce the program information of the contents authoring unit 2;

FIGS. 9A to 9D are charts that explains the process to receive the program information;

FIG. 10 is a flowchart that explains the process to display the program information of the receiving unit 31 in FIG. 1;

FIG. 11 is a flowchart that explains the process to record the program information of the receiving unit 31 in FIG. 1.

DETAILED DESCRIPTION OF THE PREFERRED EMBODIMENTS

Figure 7:
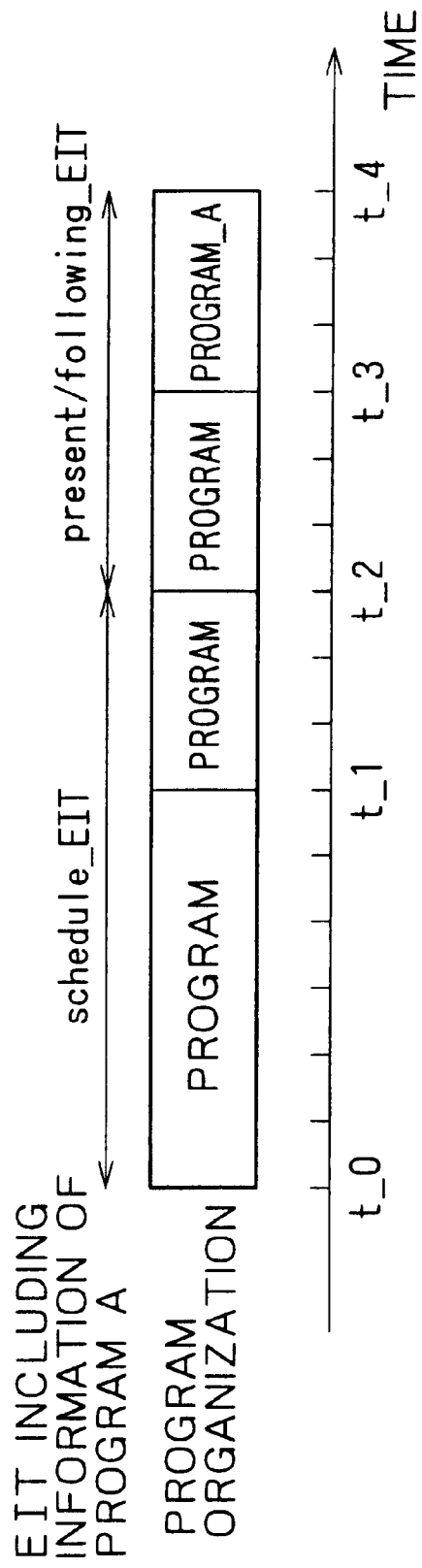
FIG. 7 is a chart to explain the transmission timing of the sEIT and pfEIT.

The construction of a digital broadcasting system to which the invention is applied will be described with reference to FIG. 1. The terms of the system in this specification signify the total units that are made up with a plurality of units and means, etc.

A contents authoring unit 2 in a program providing unit 1 for a program provider creates the contents of a program (video data, audio data, animation data, and service information data), and stores each of the data in the corresponding servers 3-1 through 3-4. The contents authoring unit 2 supplies the contents stored in the servers 3-1 through 3-4 to a contents control unit 12 in a broadcasting unit 11 for a consignment broadcaster.

The contents control unit 12 organizes the supplied contents in the broadcasting order, which are outputted to a base band unit 13. The base band unit 13 applies a specific processing to the contents, which are outputted to an encoder 14. The encoder 14 encodes the contents on the basis of the MPEG2 system, which are outputted to a multiplexer 15. The multiplexer 15 multiplexes the encoded contents, which are outputted to an up-link unit 16. The up-link unit 16 modulates the multiplexed contents into a radio frequency signal, which is supplied as a transport stream to a receiving unit 31 through a communications satellite 21.

A tuner 32 in the receiving unit 31 receives the transport stream to output it to a demodulator 33. The demodulator 33 applies to the inputted transport stream a demodulation processing corresponding to the processing of the up-link unit 16, and outputs the result to a demultiplexer 34.

The demultiplexer 34 demultiplexes the multiplexed transport stream, which are outputted to a decoder 35. The decoder 35 decodes the encoded contents, which are outputted to a contents controller 36.

The contents controller 36 makes a memory 37 temporarily store the service information (hereunder, mentioned as SI) of the inputted contents. Further, the contents controller 36 outputs the SI and other contents recorded in the memory 37 to a display control unit 38 or a VCR control unit 39 in correspondence with a specific operation by a viewer.

The display control unit 38 converts the contents such as the inputted video data, etc., into display signals that a display 51 can handle, which are outputted to the display 51.

The VCR control unit 39 supplies the contents inputted from the contents controller 36 to a VCR 52, and controls the VCR 52. An input unit 40 is operated when a user inputs various commands.

The display 51 displays the contents on the basis of the inputted display signals. The VCR 52 records the inputted contents on a magnetic tape.

The EIT (Event Information Table) being a main section in which the contents of programs (called as events in the MPEG2) of the SI generated by the contents authoring unit 2 are described includes the schedule EIT (hereunder, mentioned as sEIT) and the present/following EIT (hereunder, mentioned as pfEIT) that illustrates the present and subsequent program information. The data structure of these tables is as shown in FIG. 2. In the EIT, table_id is described by an 8-bit descriptor, and thereafter follow section_syntax_indicator through last_table_id that are each described by the descriptors using a specific number of bits.

After last_table_id follow event_id, start_time, duration, running_status, free_CA_mode, descriptors_loop_length, and descriptor ( ) that is repeated for M times, which are each described by the specific number of bits. The data structure forms a loop to repeat these for N times. And, at the end of the EIT follows CRC_32 for error detention that is described using 32 bits.

FIG. 3 illustrates a detailed data structure of a content_descriptor ( ) constituting the foregoing descriptor ( ) where program contents are described. In the content_descriptor ( ), descriptor_tag and descriptor_length are each described by the 8 bit descriptor, and thereafter follow content_nibble_0, content_nibble_1, user_nibble_0, and user_nibble_1, each described by the four bit parameter, which forms a loop structure to repeat these for N times.

In the description hereunder, content_nibble_0, content_nibble_1, user_nibble_0, and user_nibble_1, which are described by the four bit parameter, are mentioned as the content descriptor.

And, the repetition frequencies N, M of the loop structure in the EIT are arbitrary numbers, which are to be set in the contents authoring unit 2 to create the SI or the contents control unit 12. Therefore, a plurality of program information can be described to one program (event).

FIG. 4 illustrates an example of the parameter described in content_nibble_0. As mentioned above, since it is described using four bits, this parameter is able to describe 16 kinds of parameters. If 0x0 (0x indicates that the subsequent numerals are hexadecimal) is described in content_nibble_0, the program information effective in viewing and recording/reproducing are described in the subsequent content_nibble_1, user_nibble_0, and user_nibble_1. If 0x1 is described in content_nibble_0, the program information effective only in viewing are described in the subsequent content_nibble_1, user_nibble_0, and user_nibble_1. If 0x2 is described in content_nibble_0, the program information effective only in recording/reproducing are described in the subsequent content_nibble_1, user_nibble_0, and user_nibble_1. The parameters 0x3 through 0xF described in content_nibble_0 are auxiliary.

As shown in FIG. 5, when 0x0 is described in content_nibble_0, content_nibble_1, and user_nibble_0, the parameter indicates a movie, and the parameters described in user_nibble_1 correspondingly express the kinds of movies. The parameter 0x0, for example, indicates that the program genre is 'movie:general', and the parameter 0x1indicates that the program genre is 'movie:action'.

As shown in FIG. 6, when 0×1 is described in content_nibble_0, and 0×0 is described in content_nibble_1 and user_nibble_0, the parameter indicates a publicity information 'suggestion', and the parameters described in user_nibble_1 correspondingly express the kinds of 'suggestions'. The parameter 0×0, for example, indicates that the program is 'suggestion:general', and the parameter 0×1 indicates that the program is 'suggestion for this evening'.

In these cases, content_nibble_1 and user_nibble_0 are assumed not to be used.

The program information using the foregoing parameters is classified by the contents authoring unit 2 into any one of the "information effective only in viewing (in viewing during reception)", the "information effective only in recording/reproducing (in recording, or in reproducing recorded ones)", and the "information effective "in viewing and recording/reproducing". And, the program information classified into the "information effective only in viewing (in viewing on reception)" or the "information effective "in viewing and recording/reproducing" is described in both the sEIT and pfEIT. On the other hand, the program information classified into the "information effective only in recording/reproducing" is described only in the pfEIT, and not described in the sEIT.

FIG. 7 illustrates a timing when the sEIT and pfEIT having the program information of an arbitrary program A described and transmitted. The sEIT having the program information of the program A described is started to be transmitted at the broadcast start time t0, three program before the program A is transmitted; and it is continuously transmitted to the broadcast start time t2, one program before the program A is transmitted. On the other hand, the pfEIT having the program information of the program A described is started to be transmitted at the broadcast start time t2, one program before the program A is broadcast; and it is continuously transmitted to the broadcast termination time t4.

Next, the process to produce the program information of the digital broadcasting system will be described with reference to the flowchart in FIG. 8. At step S1, the contents authoring unit 2 designates a program in which the program information is described, for example, as the program "Sunday movie theater".

At step S2, the contents authoring unit 2 selects to determine the program information in relation to the program designated at step S1 out of the parameters. For example, as shown in FIG. 9A, the program information is determined as the genre 'movie:action', the publicity information 'suggestion for this evening', and the broadcasting information 'intermission halfway (news)'. However, the title 'rowdy' is described in a specific area of the SI as the text information.

Further, the contents authoring unit 2 classifies the determined program information into any one of the information effective only in viewing, the information effective only in recording/reproducing, and the information effective in viewing and recording/reproducing. For example, the contents authoring unit 2 classifies the title 'rowdy' and the genre 'movie:action' into the information effective in viewing and recording/reproducing, classifies the publicity information 'suggestion for this evening' into the information effective only in viewing, and classifies the broadcasting information 'intermission halfway (news)' into the information effective only in recording/reproducing.

At step S3, the contents authoring unit 2 determines whether there is an information classified into the "information effective only in viewing". If it determines that the information classified into the "information effective only in viewing" is not present, the process skips step S4; and if it determines that the information classified into the "information effective only in viewing" is present, the process advances to step S4. At step S4, the contents authoring unit 2 describes the program information (for example, the publicity information 'suggestion for this evening') classified into the information effective only in view in both the sEIT and the pfEIT.

At step S5, the contents authoring unit 2 determines whether there is an information classified into the "information effective only in recording/reproducing". If it determines that the information classified into the "information effective only in recording/reproducing" is not present, the process skips step S6; and if it determines that the information classified into the "information effective only in recording/reproducing" is present, the process advances to step S6. At step S6, the contents authoring unit 2 describes in the pfEIT the program information (for example, the broadcasting information 'intermission halfway (news)') classified into the "information effective only in recording/reproducing".

At step S7, the contents authoring unit 2 determines whether there is an information classified into the "information effective in viewing and recording/reproducing". If it determines that the information classified into the "information effective in viewing and recording/reproducing" is not present, the process skips step S8; and if it determines that the information classified into the "information effective in viewing and recording/reproducing" is present, the process advances to step S8. At step S8, the contents authoring unit 2 describes the program information (for example, the title 'rowdy' and the genre 'movie:action') classified into the "information effective in viewing and recording/reproducing" in both the sEIT and the pfEIT.

In the foregoing process to produce the program information, the contents authoring unit 2 is described to produce the program information; however, the contents control unit 12 may produce, add, or modify the program information.

The program information thus produced is broadcast in conformity with the timing shown in FIG. 7, and received by the receiving unit 31.

Next, the process to display the program information of the receiving unit 31 in FIG. 1 will be described with reference to the flowchart in FIG. 10. This process starts when a user commands the receiving unit 31 to display a program information through the input unit 40. Suppose that a transport stream of a program in which the SI including the program information, for example, as shown in FIG. 11 is set is supplied from the up-link unit 16 of the broadcasting unit 11 to the receiving unit 31 through the communications satellite 21. Then, the transport stream is received by the tuner 32, demodulated by the demodulator 33, demultiplexed by the demultiplexer 34, further decoded by the decoder 35, and the result is inputted to the contents controller 36.

The contents controller 36 makes the memory 37 temporarily store the SI of the decoded contents.

At step S11, the contents controller 36 selects the program (for example, 'Sunday movie theater') of the channel now being received as a program whereby the program information is displayed.

At step S12, the contents controller 36 determines whether the SI includes the sEIT corresponding to the program selected at step S11. If the SI is determined not to include the sEIT, the process skips step S13 and S14; and if the SI is determined to include the sEIT, the process advances to step S13.

At step S13, the contents controller 36 determines whether the sEIT includes the information effective in viewing (the "information effective in viewing and recording/reproducing", or the "information effective only in viewing"). If the sEIT is determined not to include the information effective in viewing, the process skips step S14; and if the sEIT is determined to include the information effective in viewing, the process advances to step S14.

At step S14, the contents controller 36 supplies the display control unit 38 with the information effective in viewing described in the sEIT (for example, the publicity information 'suggestion for this evening' classified into the "information effective only in viewing", and the title 'rowdy' and the genre 'movie:action' classified into the "information effective in viewing and recording/ reproducing"). The display control unit 38 converts the information into specific display signals to output to the display 51. The display 51 displays the title 'rowdy', the genre 'movie:action', and the publicity information 'suggestion for this evening' in accordance with the inputted display signals, as shown in FIG. 9B.

At step S15, the contents controller 36 determines whether the SI includes the pfEIT corresponding to the program selected at step S11. If the SI is determined not to include the pfEIT, the process skips step S16 and S17; and if the SI is determined to include the pfEIT, the process advances to step S16.

At step S16, the contents controller 36 determines whether the pfEIT includes the information effective in viewing (the "information effective in viewing and recording/reproducing", or the "information effective only in viewing"). If the pfEIT is determined not to include the information effective in viewing, the process skips step S17; and if the pfEIT is determined to include the information effective in viewing, the process advances to step S17.

At step S17, the contents controller 36 supplies the display control unit 38 with the information effective in viewing described in the pfEIT (for example, the publicity information 'suggestion for this evening' classified into the "information effective only in viewing", and the title 'rowdy' and the genre 'movie:action' classified into the "information effective in viewing and recording/ reproducing"). The display control unit 38 converts the information into specific display signals to output to the display 51. The display 51 displays the title 'rowdy', the genre 'movie:action', and the publicity information 'suggestion for this evening' in accordance with the inputted display signals, as shown in FIG. 9B.

In this case, since the information effective in viewing described in the sEIT is identical to the information effective in viewing described in the pfEIT, the process of step S15 through Step S17 can be considered unnecessary. However, there is a possibility that different program information are described each in the sEIT and pfEIT, and further the sEIT and pfEIT are not cached in the receiving unit 31 (the memory 37 has not a caching function). Therefore, the process of step S15 through S17 is necessary.

Next, the process to record the program information of the receiving unit 31 will be described with reference to the flowchart in FIG. 11. This process starts when a user commands the receiving unit 31 to record a program information through the input unit 40.

At step S21, the contents controller 36 selects the program (for example, 'Sunday movie theater') instructed by the user as a program from which the program information is recorded.

At step S22, the contents controller 36 determines whether the SI includes the sEIT corresponding to the program selected at step S21. If the SI is determined not to include the sEIT, the process skips step S23 and S24; and if the SI is determined to include the sEIT, the process advances to step S23.

At step S23, the contents controller 36 determines whether the sEIT includes the information effective in recording (the "information effective in viewing and recording/reproducing", or the "information effective only in recording/reproducing"). If the sEIT is determined not to include the information effective in recording, the process skips step S24; and if the sEIT is determined to include the information effective in recording, the process advances to step S24.

At step S24, the contents controller 36 supplies the VCR control unit 39 with the information effective in recording described in the sEIT (for example, as shown in FIG. 9C, the title 'rowdy' and the genre 'movie:action' classified into the "information effective in viewing and recording/ reproducing", and the broadcasting information 'intermission halfway (news)' classified into the "information effective only in recording/reproducing"). The VCR control unit 39 supplies the VCR 52 with the information to record.

At step S25, the contents controller 36 determines whether the SI includes the pfEIT corresponding to the program selected at step S21. If the SI is determined not to include the pfEIT, the process skips step S26 and S27; and if the SI is determined to include the pfEIT, the process advances to step S26.

At step S26, the contents controller 36 determines whether the pfEIT includes the information effective in recording (the "information effective in viewing and recording/reproducing", or the "information effective only in recording/reproducing"). If the pfEIT is determined not to include the information effective in recording, the process skips step S27; and if the pfEIT is determined to include the information effective in recording, the process advances to step S27.

At step S27, the contents controller 36 supplies the VCR control unit 39 with the information effective in recording described in the pfEIT (for example, as shown in FIG. 9C, the title 'rowdy' and the genre 'movie:action' classified into the "information effective in viewing and recording/ reproducing", and the broadcasting information 'intermission halfway (news)' classified into the "information effective only in recording/reproducing"). The VCR control unit 39 supplies the VCR 52 with the information to record.

In this case, since the information effective in recording described in the sEIT is identical to the information effective in recording described in the pfEIT, the process of step S25 through Step S27 can be considered unnecessary. However, there is a possibility that different program information are described each in the sEIT and pfEIT, and further the sEIT and pfEIT are not cached in the receiving unit 31 (the memory 37 has not a caching function). Therefore, the process of step S25 through Step S27 is necessary.

The VCR control unit 39 controls the VCR 52 to record the program 'Sunday movie theater' at the broadcast start time of the program selected at step S21, and while the program 'Sunday movie theater' is interrupted by a news on the air, it controls the VCR 52 to discontinue the recording on the basis of the broadcasting information 'intermission halfway (news)' classified into the "information effective only in recording/reproducing".

FIG. 9D illustrates an example in which the program information recorded by the VCR 52 is reproduced to be displayed on the display 51. Since the VCR 52 has not recorded the "information effective only in viewing", the display 51 at the moment does not display the publicity information 'suggestion for this evening' classified into the "information effective only in viewing", as it is clear in comparison of FIG. 9D and FIG. 9B.

In the foregoing embodiment has been described the program information transmitted from an arbitrary channel A in correspondence with a program broadcast through the channel A. Next, the program information transmitted from the channel A in correspondence with a program broadcast through a channel B other than the channel A will be described.

In the digital multi-channel broadcast system to which the invention is applied, plural channel (for example 8 channel) video information are multiplexed into forming a transport stream, and a plurality of the transport streams (for example, 10 transport streams) are transmitted to implement a multi-channel broadcast (for example, 80 (=8×10) channels).

When a program broadcast through a channel CH6 is received, if a transport stream into which channels CH1 through CH8 (including CH6), for example, are multiplexed is regarded as an actual stream and the other transport stream into which channels CH9 through CH16, for example, are multiplexed is regarded as the other stream, in the pfEIT of the program information contained in this actual stream are described the information effective in viewing and the information effective in recording the program contained in the actual steam (channels CH1 through CH8), and the information effective in viewing the program broadcast through the other stream (channels CH9 through CH16).

Therefore, during viewing the channel CH6, a user is able to utilize the information effective in viewing corresponding to the channel CH10 in the other stream; however, the user is not able to use the information effective in recording, since the information is not present. The information effective in recording corresponding to the channel CH10 is contained in the transport stream of the channels CH9 through CH16, and when the program of the channel CH10 is recorded, since the transport stream of the channels CH9 through CH16 can be received as the actual stream, any problems will not be caused.

Further, the computer program the executes the foregoing processes can be provided to users through information recording media such as a magnetic disk, CD-ROM, etc., and network media such as the Internet, digital satellite, etc.

What is claimed is:

1. A digital broadcasting information transmitting unit comprising:
   generation means for generating a video data based on a program;
   determination means for determining a service information relating to the video data generated by the generation means;
   classification means for classifying the service information determined by the determination means into a first program information that is relevant to viewing the program and a second program information that is relevant to recording and reproducing the program;
   description means for tabulating the first program information into schedule and present/following event information tables, and tabulating the second program information into the present/following event information; and
   encoding means for encoding the video data and the schedule and present/following event information tables into a video stream corresponding to a broadcast channel.

2. The digital broadcasting information transmitting unit according to claim 1, wherein the description means further tabulates into the present/following event information table the second program information corresponding to video data that is to be transmitted by another video stream.

3. The digital broadcasting information transmitting unit according to claim 1, further comprising a transmitter for simultaneously transmitting the encoded video data and corresponding present/following event information table.

4. The digital broadcasting information transmitting unit according to claim 3, wherein said transmitter further transmits said schedule event information table prior to transmitting the corresponding encoded video data.

5. The digital broadcasting information transmitting unit according to claim 1, wherein said first program information includes a program title, a program type, and a program genre.

6. The digital broadcasting information transmitting unit according to claim 5, wherein said first program information further includes a viewing suggestion.

7. A method of transmitting a digital broadcasting information, comprising the steps of:
   a generating step of generating a video data based on a program;
   a determination step for determining a service information relating to the video data generated by the generation step;
   a classification step of classifying the service information determined by the determination step into a first program information that is relevant to viewing the program and a second program information that is relevant to recording and reproducing the program;
   a description step of tabulating the first program information into schedule and present/following event information tables, and tabulating the second program information into the present/following event information table; and
   an encoding step of encoding the video data and the schedule and present/following event information tables into a video stream corresponding to a broadcast channel.

8. The method of transmitting a digital broadcasting information according to claim 6, wherein the description step further tabulates into the present/following event information table the second program information corresponding to video data that is to be transmitted by another video stream.

9. The method of transmitting a digital broadcasting information according to claim 7, wherein said first program information includes a program title, a program type, and a program genre.

10. The method of transmitting a digital broadcasting information according to claim 9, wherein said first program information further includes a viewing suggestion.

11. The method of transmitting a digital broadcasting information according to claim 7, further comprising a transmitting step of simultaneously transmitting the encoded video data and corresponding present/following event information table.

12. The method of transmitting a digital broadcasting information according to claim 11, wherein said transmitting step further transmits said schedule event information table prior to transmitting the corresponding encoded video data.

13. An information receiving unit for receiving an encoded video data that includes a program and a corresponding service information classified on the basis of relevance to viewing, recording, and reproducing said program, the information receiving unit comprising:

decoding means for decoding the encoded video data;

extracting means for extracting the service information from the video data decoded by the decoding means;

receiving means for receiving commands from a user of said information receiving unit; and processing means for processing the video data into said program in accordance with the user's commands and the extracted service information.

14. The information receiving unit according to claim 13, wherein said service information is classified into a first program information that is relevant to viewing the program and a second program information that is relevant to recording and reproducing the program.

15. A method of receiving an encoded video data that includes a program and a corresponding service information classified on the basis of relevance to viewing, recording, and reproducing said program, comprising the steps of:

a decoding step of decoding the encoded video data;

an extracting step of extracting the service information from the video data decoded by the decoding step;

a receiving step of receiving commands from a user of said information receiving unit; and a processing step of processing the video data into said program in accordance with the user's commands and the extracted service information.

16. The method of receiving an encoded video data according to claim 15, wherein said service information is classified into a first program information that is relevant to viewing the program and a second program information that is relevant to recording and reproducing the program.

\* \* \* \* \*